No. 619,460. Patented Feb. 14, 1899.
W. S. ANDREWS.
COMBINED SPRING BALANCE AND READY RECKONER.
(Application filed Dec. 23, 1898.)
(No Model.)
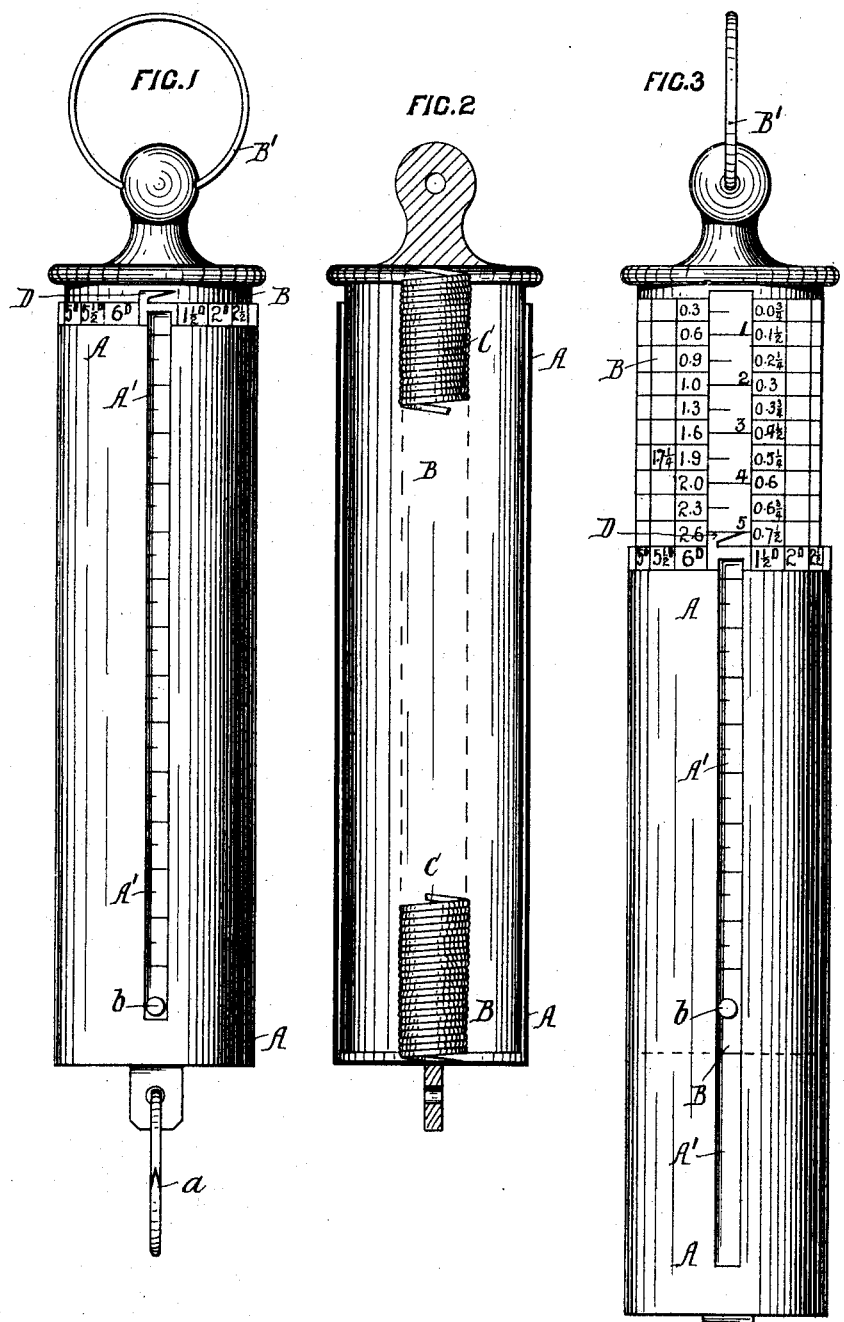
Witnesses:
Inventor:
William Somerset Andrews

UNITED STATES PATENT OFFICE.

WILLIAM SOMERSET ANDREWS, OF WOODSIDE, NEW SOUTH WALES, ASSIGNOR OF ONE-HALF TO JOHN BOOCK, OF SAME PLACE.

COMBINED SPRING-BALANCE AND READY-RECKONER.

SPECIFICATION forming part of Letters Patent No. 619,460, dated February 14, 1899.

Application filed December 23, 1898. Serial No. 700,125. (No model.)

*To all whom it may concern:*

Be it known that I, WILLIAM SOMERSET ANDREWS, a subject of the Queen of Great Britain and Ireland, and a resident of Woodside, Manning River, in the county of Gloucester and Colony of New South Wales, have invented a certain new and useful Combined Spring-Balance and Ready-Reckoner, of which the following is a specification.

This invention has been devised for the purpose of indicating when an article is weighed on the balance what is its weight and monetary value at the rate of certain values per unit of weight.

The invention consists of two hollow cylinders of different diameters that are placed one within the other and connected together by means of a helical spring. The inner cylinder is closed at its top end and is provided with means whereby it may be suspended. The outer cylinder is closed at its lower end, and to this end is attached the article whose weight and value it is desired to ascertain.

The top edge of the outer cylinder is marked with a scale representing units of value. An indicator-pointer is attached to the top edge of the outer cylinder, and this pointer covers a vertical column upon the cylindrical face of the inner cylinder, which column is marked with the ordinary weighing-scale divisions. On each side of this column and running parallel therewith are a number of vertical columns which coincide with the spaces on the horizontal scale of the outer cylinder. Upon these columns are marked the gross values of the different weights at units of price upon the horizontal scale on the outer cylinder; but in order that the invention may be properly understood reference is made to the accompanying sheet of drawings, in which—

Figure 1 is a front elevation of the appliance. Fig. 2 is a sectional elevation of the same, showing the spring connection between the inner and the outer cylinders. Fig. 3 is a front elevation with the outer cylinder weighted and showing the markings on the inner cylinder.

A is the outer cylinder, and B the inner cylinder, which fits loosely within it. The top end of the inner cylinder B is closed and provided with means, such as the ring B', whereby it may be suspended. The bottom end of the outer cylinder A is also closed and is provided with a hook $a$, on which may be hung the article whose weight it is desired to ascertain. The two cylinders A and B are connected together by means of the helical spring C, the two ends of which are secured to the closed ends of the two cylinders, so that the outside cylinder will be suspended from the inner cylinder and be free to move up and down thereupon when the spring is placed in or released from tension. In order to prevent the outer cylinder A from being pulled down too far or from turning around on the cylinder B, it is provided with a slot A', through which passes the small stud projection $b$, that is attached to the inner cylinder B. To the top edge of the outer cylinder A is attached the indicator-pointer D.

Around the upper end of the outside cylinder A is a single horizontal scale which is divided into a number of spaces in which are marked the different units of value per pound of any commodities. Down the face of the inner cylinder B and in a line with the indicator-pointer D, attached to the outer cylinder, is a vertical column in which are marked the ordinary weighing-scale divisions. Running parallel with this scale are a number of vertical columns, which coincide with the divisions marked upon the horizontal scale on the outer cylinder. Each of those columns is divided into a number of divisions corresponding with the markings upon the weighing-scale, the centers of the divisions being in the same straight lines as the scale-markings. In these divisions are marked the gross values of the different weights indicated on the weighing-scale at the rates of the unit values marked upon the divisions on the horizontal scale on the outer cylinder.

The indicator-pointer D is so adjusted that at the same time that it indicates the weight of an article suspended from the outer cylinder A it will point to the line of divisions in which will be found the value of such weight at the different units of value marked on the outer cylinder. For instance, if it is desired to ascertain the weight and value of a certain article at the rate of five and one-half pence per pound the article is suspended from the outer cylinder, which is then drawn down until the pointer D is on a level with, say, the three-and-one-half-pounds mark on the scale. This will give the weight of the article—viz., three and one-half pounds—and in order to ascertain its value the operator would then look at the column on the inner cylinder which coincided with the division in the scale on the outer cylinder in which the amount of five and one-half pence was marked, and in that column, in the same horizontal line with the indicator-pointer D, will be found the value of the article—viz., one shilling seven and one-fourth pence.

Having now described my invention, what I claim as new, and desire to secure by Letters Patent, is—

In combination an inner and an outer cylinder which are internally connected together by means of a spring the open end of the outer cylinder being provided with a horizontal scale in which are marked units of value and with an indicator-pointer, while the inner cylinder is provided with a vertical scale or column upon which is marked an index of weights, the surface of this internal cylinder being further marked with vertical columns coinciding with the spaces on the horizontal scale on the outer cylinder, and with rings corresponding with the index of weights, the spaces thus formed being filled in with the gross values of goods of the weights on the index and at the price on the horizontal scale, as herein specified.

In witness whereof I have hereunto set my hand in presence of two witnesses.

WILLIAM SOMERSET ANDREWS.

Witnesses:
MANFIELD NEWTON,
JAS. T. HUNTER.